Jan. 13. 1925.

J. KNOUREK 1,522,525

COMBINED BUMPER AND SAFETY FENDER

Filed Sept. 28, 1923

INVENTOR
Joseph Knourek
BY Frank Schraeder Jr
Attorney

Patented Jan. 13, 1925.

1,522,525

UNITED STATES PATENT OFFICE.

JOSEPH KNOUREK, OF CHICAGO, ILLINOIS.

COMBINED BUMPER AND SAFETY FENDER.

Application filed September 28, 1923. Serial No. 665,286.

*To all whom it may concern:*

Be it known that I, JOSEPH KNOUREK, a citizen of the United States, residing at Chicago, in the county of Cook and State of Illinois, have invented new and useful Improvements in Combined Bumpers and Safety Fenders, of which the following is a specification.

This invention relates to improvements in combined bumpers and safety fenders for automobiles and other vehicles and has among its objects to provide a bumper or guard which shall be adaptable for use also as a safety fender.

It is also an object to provide a fender cooperatively arranged with the bumper whereby the fender may be raised out of operative position into alignment with the bumper to form substantially a reinforced bumper.

With these and other objects in view, my invention consists in the combination and construction of the various parts and members, illustrated in the attached drawings, described in the following specification and particularly pointed out in the appended claims.

Figure 1:
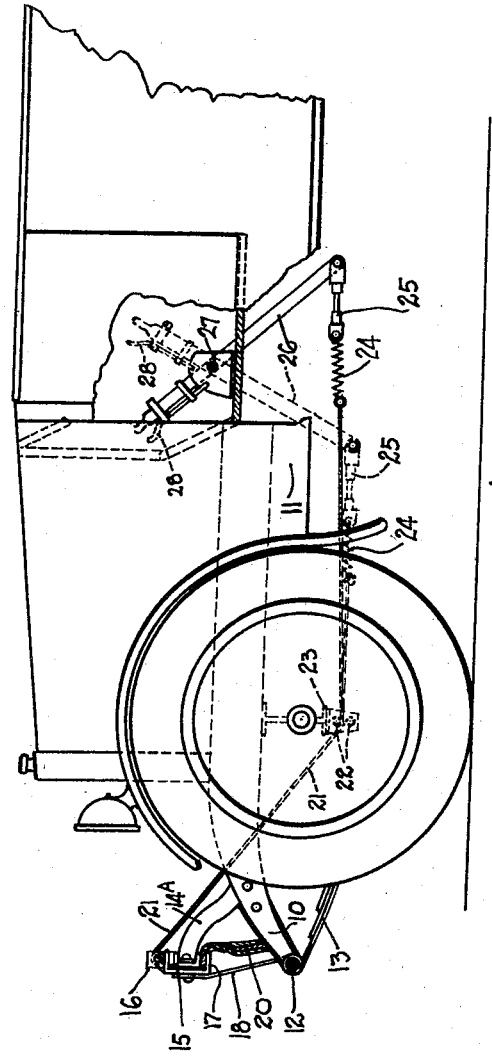

In the illustrations, Fig. 1 is a side view of the front portion of an automobile showing one form of my invention with the safety fender in closed or raised position.

Figure 2:
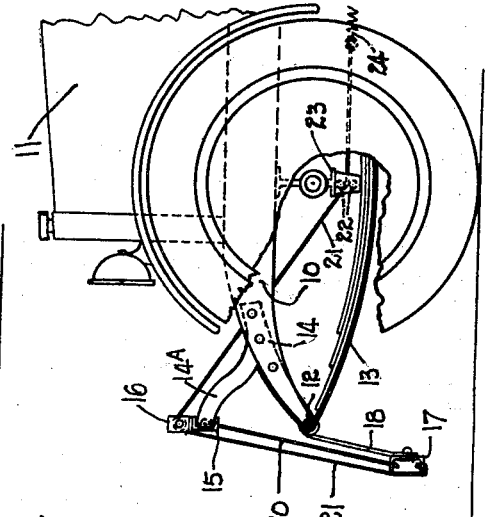

Fig. 2 also shows a front portion of an automobile with my guard or bumper and safety fender in operative or lowered position.

Figure 3:
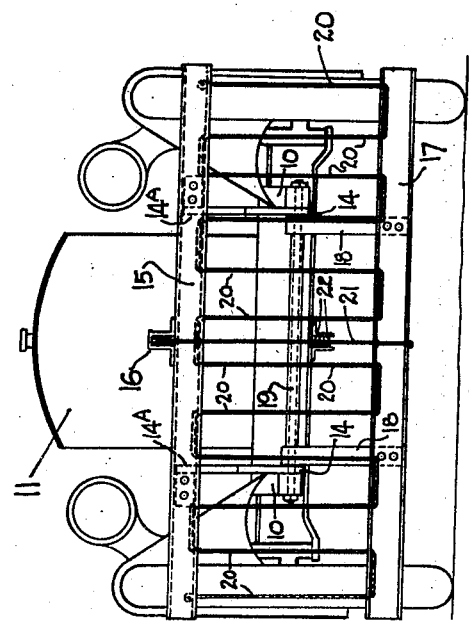

Fig. 3 is a front view of Fig. 2.

Referring to the drawings, 10 indicates the frame of the automobile, which supports the body of the automobile about the pivotal rod 12 on the spring 13. Secured to the frame 10 are brackets 14, each having an integral arm 14ᴬ riveted to the bumper 15, which is here preferably shown as of a channel cross section. This bumper 15 extends across the front of the car slightly beyond the front wheels and carries on its top flange a centrally mounted housed sheave 16.

The safety fender 17 is also here preferably shown as of channel cross section, of the same length as the bumper but of a slightly higher section to permit its folding over or embrace of the bumper 15 when in raised position as shown in Figure 1.

The fender 17 is pivotally mounted on the bars 18 to which it is riveted and the bars 18 are loosely mounted on the rod 12 which extends between the end of the two frames 10. A pipe separator 19 is inserted between the pivotal bars 18. The fender 17 is also supported by a flexible rope or chain 20 which is interlaced between the lower flange of the bumper 15 and the upper flange of the fender 17. This flexible rope not only supports the fender 17 but also forms a grille or guard between it and the bumper 15.

In order to raise the fender 17 out of operative position into alignment with the bumper, I attach a light cable 21 to the bottom flange of the fender, which cable 21 passes over the sheave 16 and thence downwardly between the two small rollers 22 which are supported in a housing under the front axle 23. The end of the cable 21 is preferably fixed to a coil spring 24 which in turn is connected to the operating lever 26 by an adjustable link 25. The operating lever is pivoted at 27 and is provided with a spring latch 28 for retaining the lever in either open or closed position of the fender.

When in open position, as shown in Fig. 2, the weight of the fender 17 exerts a slight tension on the spring 24 so that any objectionable vibrations are reduced to the minimum.

From the above it will readily become apparent that I have provided a combined bumper and safety fender which is not only low in cost of manufacture and installation but which permits the folding of the fender over the bumper when driving over rough or uneven ground. In folded position the fender reinforces the bumper.

I claim:

1. A combined bumper and safety fender, comprising a rigidly mounted bumper of channel cross-section, a pivotally mounted fender of larger cross-section than said bumper, and means for raising said fender into alignment with said bumper to embrace and reinforce same.

2. A device as embodied in claim 1 and including a flexible interwoven support for supporting said fender from said bumper when in lowered position.

In witness whereof I affix my signature.

JOSEPH KNOUREK.